J. F. O'CONNOR.
FRICTION SHOCK ABSORBING MECHANISM.
APPLICATION FILED JULY 1, 1918.
1,303,379.
Patented May 13, 1919.
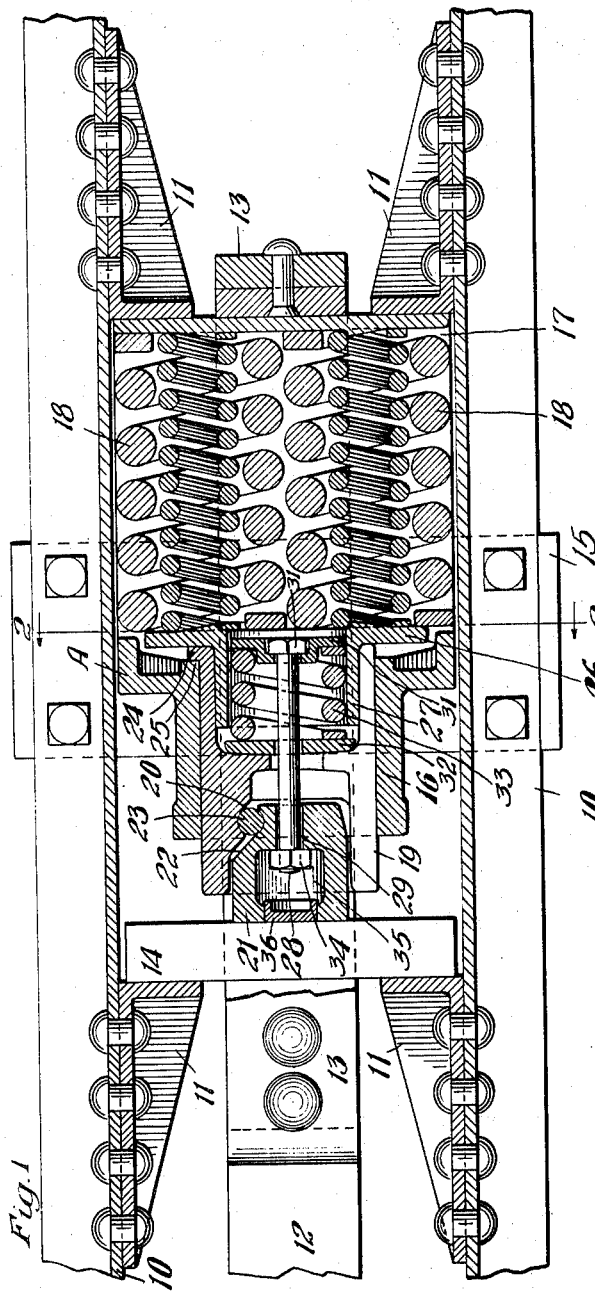
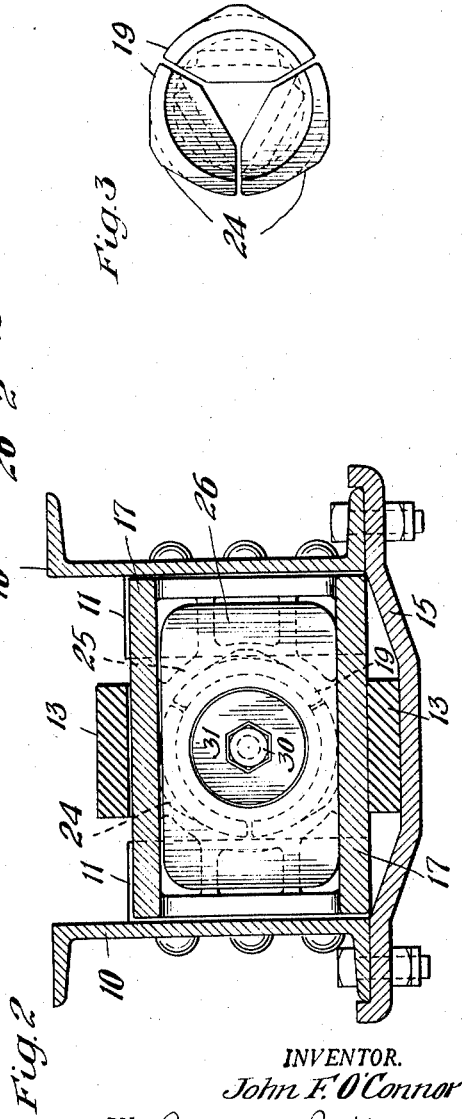
WITNESSES:
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,303,379.　　　　　Specification of Letters Patent.　　Patented May 13, 1919.

Application filed July 1, 1918. Serial No. 242,824.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanisms.

Heretofore, in the manufacture of friction shock absorbing mechanisms, and more particularly those designed for railway draft riggings, it has been customary to employ a retaining bolt that engages one of the friction elements at one of its ends and engages either the shell or other element, at its other end. These retaining bolts are employed for two purposes, broadly speaking, one of them being to retain all of the friction elements in properly assembled relation after they have once been placed within the friction shell, and the other, to hold the friction elements in compact relation to eliminate vibration and consequent wear. So far as I am aware, it has been the universal practice to so arrange the retaining bolt that it becomes loose or "floats" during the compressive action of the shock absorbing mechanism as the friction elements are moved inwardly relatively to the shell and upon the release action, the friction elements are impelled to their outermost extreme position under the influence of the heavy springs with the result, that when the friction elements reach their outermost or normal position, they are moving at a rapid rate and possess considerable momentum. This results in the retaining bolts being required to take up all or a part of this energy of the moving friction elements, the bolt being compelled to withstand the sudden shock due to the holding or stopping of the friction elements at their outermost position. This has resulted in excessive wear and damage to the bolts due to the continued sudden shocks imposed thereon and frequently causes shearing off of the nuts or bolt heads or the snapping of the bolts themselves. This break-down of the bolt, of course, necessitates repair of the shock absorbing mechanism which, in the case of friction draft gears for railway cars, means that the car must be taken out of service for some time and the labor of taking down and repairing the shock absorbing mechanism is high.

The object of my invention is to provide an arrangement of retaining bolt for friction shock absorbing mechanism, and more particularly those employed in railway draft riggings, such that the retaining bolt is relieved of all the sudden shocks when the parts are returned to normal position in release.

Another and more specific object of the invention, is to provide an arrangement for a retaining bolt of friction shock absorbing mechanisms such that the retaining bolt never becomes a "floating" element, but on the contrary, is always held automatically under a substantially uniform spring tension and moves bodily in unison with the friction elements.

In the drawing forming a part of this specification, Figure 1 is a horizontal, sectional view of a portion of a railway draft rigging showing my improvements applied to a friction gear. Fig. 2 is a vertical, transverse, sectional view, taken on the line 2—2 of Fig. 1. And Fig. 3 is an elevational view of the inner ends of the friction shoes in assembled relation.

In said drawing, 10—10 denote channel draft sills of a railway car having the usual front and rear stops 11—11 secured to the inner faces thereof. A draw bar 12 is operatively connected to the shock absorbing mechanism by a yoke 13, the shock absorbing mechanism being designated generally by the reference A. At the front of the shock absorbing mechanism is a front follower 14 and all of the parts may be supported by a detachable saddle plate 15.

The shock absorbing mechanism, as shown, comprises a casting having formed integrally therewith a friction shell 16 and a substantially rectangular spring cage 17 open at its sides to receive laterally therein the two main springs 18—18 of the mechanism. Within the friction shell is arranged a series of friction shoes 19—19, each of said shoes having a wedge face 20. Coöperable with the friction shoes is a central wedge or spreader 21 having wedge faces 22 corresponding to said wedge faces 20. Anti-friction rollers 23 are interposed between the sets of wedge faces 20 and 22 in a well known manner.

The friction shoes 19 extend to the inner end of the friction shell 16 proper and each shoe is preferably provided with an outward radially extended flange 24 adapted to engage the adjacent annular shoulder 25 formed on the inner end of the shell 16 so that the shoes are limited in their outward movement with respect to the shell. At the front end of the springs 18 is located a spring follower 26 having a forwardly extended annular flange 27 disposed within the rear ends of the friction shoes 19.

To hold the friction elements in compact formation and to eliminate vibration between the respective parts, I provide a short retaining bolt 28 which extends through a suitable opening 29 in the wedge 21 and between the friction shoes 19. Said bolt 28 carries a head 30 at its rear end against which is seated a small plate or spring follower 31. Also mounted on the bolt 28 is a washer 32 which bears against inwardly extending shoulders formed on the shoes 19 and between said washer 32 and the follower 31 is a relatively light spring 33 held under an initial compression. The nut 34 is applied to the outer end of the bolt within a suitable cavity 35 formed in the wedge, the cavity being closed after the parts are assembled by means of a suitable plug 36.

From an examination of Fig. 1, it will be seen that the small follower 31 is disposed slightly forward of the rear face of the follower 26 so that said small follower 31 does not come into contact with the main springs 18. By mounting the bolt 28 in the manner described, it is evident that the wedge is pulled inwardly with respect to the friction shoes by means of the spring 33 so that the wedge, anti-friction rollers, shoes, bolt 28 and spring 33 act substantially as a single unit with the bolt always under tension of the spring 33. As is well known, in the actual operation of friction mechanisms of the type herein disclosed, the movement between the wedge and the friction shoes during compression is very slight, normally being $\frac{1}{16}$th of an inch or even less. Consequently, as the gear is compressed, the wedge, anti-friction rollers, friction shoes, bolt 28 and spring 33, travel inwardly as a unit and also as a unit under release. In release, the shoes are stopped in their outward movement under the expansive action of the springs 18 by the flanges 24 engaging the annular shoulder 25. In this manner, the shock incident to the sudden stopping of the parts under release is transferred to the friction shoes and shell which are well able to withstand the same because of their much heavier construction and the bolt 28 is thereby relieved of the disastrous shocks hereinbefore referred to.

Although I have herein shown and described what I now consider the preferred manner of carrying out the invention, the same is merely illustrative and I contemplate all changes and modifications that come within the scope of the claim appended hereto.

I claim:

In a friction shock absorbing mechanism, the combination with a friction shell and a spring casing associated therewith, said shell having a rearwardly facing shoulder, of a plurality of friction shoes coöperable with said shell, said shoes having forwardly facing shoulders arranged to engage the shoulder of the shell when the parts are in normal condition, a wedge associated with the shoes, a spring follower disposed within the casing, spring means in the casing coöperable with said follower, a retaining bolt extending from said wedge between the shoes, said shoes having inwardly extending shoulders intermediate their ends, and a spring interposed between said inner shoulders of the shoes and the inner end of the bolt, whereby the shoes and wedge are limited in their outward movement with respect to the shell by said coöperating shoulders on the shell and shoes and said bolt and spring immediately associated therewith serve to retain the friction elements in tight engagement with the bolt under a substantially constant tension.

In witness that I claim the foregoing I have hereunto subscribed my name this 15th day of June, 1918.

JOHN F. O'CONNOR.